United States Patent [19]

Paulonis et al.

[11] 4,005,988

[45] Feb. 1, 1977

[54] INTERLAYER FOR TRANSIENT LIQUID PHASE DIFFUSION BONDING

[75] Inventors: Daniel Francis Paulonis, Moodus; David Scott Duvall, Cobalt; Gerard Casimer Sikorowicz, Kensington, all of Conn.

[73] Assignee: United Technologies Corporation, Hartford, Conn.

[22] Filed: Dec. 19, 1975

[21] Appl. No.: 642,626

[52] U.S. Cl. .................................. 29/194; 228/194
[51] Int. Cl.[2] ........................................ B32B 15/00
[58] Field of Search ............ 29/194, 198, 180, 191; 228/194

[56] References Cited

UNITED STATES PATENTS

| | | | |
|---|---|---|---|
| 3,478,416 | 11/1969 | Hamilton | 228/194 |
| 3,530,568 | 9/1970 | Owczarski et al. | 228/194 |
| 3,678,570 | 7/1972 | Pavlonis et al. | 228/194 |
| 3,753,794 | 8/1973 | Pavlonis et al. | 29/194 X |
| 3,854,194 | 12/1974 | Woodward | 228/194 |

Primary Examiner—L. Dewayne Rutledge
Assistant Examiner—E. L. Weise
Attorney, Agent, or Firm—Richard N. James

[57] ABSTRACT

A reduced melting point interlayer for transient liquid phase diffusion bonding of the nickel, cobalt and iron alloys is provided as a thin coating integral with one or more of the surfaces to be joined.

12 Claims, No Drawings

INTERLAYER FOR TRANSIENT LIQUID PHASE DIFFUSION BONDING

BACKGROUND OF THE INVENTION

The present invention relates in general to the art of diffusion bonding and, more particularly, to diffusion bonding of the superalloys utilizing a transient liquid phase in the bonding process.

Transient liquid phase diffusion bonding has been shown to be a very useful method for producing high quality diffusion bonds in the high temperature superalloys, such as those used in the manufacture of gas turbine engine hardware. Such bonding is described in detail in the U.S. Pat. No. 3,678,570 to D. F. Paulonis et al, of common assignee herewith, and whose teachings are incorporated herein by reference.

The superalloys are recognized as those alloys, usually having basis in nickel, cobalt or iron, or some combination thereof exhibiting good high temperature strength and oxidation resistance in environments such as gas turbine engines. Usually, these alloys also contain substantial quantities of chromium and also a limited amount of other elements such as aluminum, titanium and the refractory metals.

It is frequently desirable to make certain gas turbine engine components by joining easily fabricable segments together into the desired configurations. However, the limited weldability of many of the superalloys has severely limited the applicability of fusion welding techniques in the production of structural hardware. Further, many components, because of their design, are simply not adapted to the utilization of fusion welding. Brazing, while offering a number of advantages over fusion welding, has very limited application because of the penalties associated with the relatively low strengths and low melting points associated with the typical brazed joints.

The relative simplicity and reproducibility of the transient liquid phase diffusion bonding technique in the production of high quality bonds in sensitive hardware has led to substantial usage thereof. This is particularly true in the gas turbine engine industry, although the invention described herein is obviously not limited thereto.

One key element in the transient liquid phase diffusion bonding technique is the provision, between the surfaces to be joined, of a thin alloy interlayer. The composition of the interlayer preferably and generally should be tailored to the alloys being joined, particularly with respect to the inclusion therein of those elements whose presence is required in the finished bond area and whose solid state diffusion rates are slow. It is also desirable to exclude from the interlayer alloy those elements which may adversely affect the bonding process or the quality of the finished joint. In all of the interlayer compositions a high boron content is utilized.

One method of getting the interlayer alloy species between the faying surfaces is through the use of a thin, ductile foil of the type described in the U.S. Pat. No. 3,753,794 to D. F. Paulonis et al, which also shares a common assignee herewith. Although the use of a foil is satisfactory for many if not most applications, in certain circumstances such as the joining of complex, multifaceted or rough surfaces or when very thin (e.g., .0005 inch) interlayers are required, the use of foil may be difficult or uneconomical. In these cases it would be desirable to be able to provide the interlayer composition as a thin layer integral with one or more of the faying surfaces themselves, such as by means of a plate or coating on such surfaces. Of course, the interlayer composition viewed in its entirety must necessarily be a multicomponent material.

SUMMARY OF THE INVENTION

According to the present invention an interlayer alloy for transient liquid phase diffusion bonding is provided as a thin coating integral with one or more of the surfaces to be joined.

In one embodiment of the invention the coating comprises one layer of chromium and another layer comprising the basis metal of the alloys to be joined together with a quantity of boron as a melting-point depressant.

DESCRIPTION OF THE PREFERRED EMBODIMENTS

Electroless plating using an amine borane as the reducing agent has been utilized to deposit high boron containing alloys on substrates. The amine borane baths, such as are disclosed in U.S. Pat. No. 3,338,726 are a fairly recent developement in plating technology and have been used for applying plates of nickel/boron and cobalt/boron. Such baths contain a source of metal ions, the the reducing agent dimethylamine borane, and usually a stabilizer and a wetting agent.

A plate comprising, by weight, 81 percent nickel, 15 percent cobalt and 4 percent boron can be produced from the following bath:

| Ingredient | Amount |
| --- | --- |
| $NiSO_4 \cdot 6H_2O$ | 20 g./l. |
| $CoSO_4 \cdot 5H_2O$ | 5 g./l. |
| $C_6H_7O_8 \cdot H_2O$ | 10 g./l. |
| HCl | 25 ml./l. |
| $NH_4OH$ | to pH 5.5 |
| $(CH_3)_2NHBH_3$ | 2.5 – 3 g./l. |
| MBT (2-Mercaptobenzothiazole) | 0.5 – 2 mg./l. |
| Plating temperature | 150° F. |

To initially demonstrate the feasibility of using a surface coating as the bonding interlayer in a transient-liquid-phase diffusion bonding process for the superalloys, a joint was made between pieces of a nickel base alloy of the following composition, by weight: 15 percent chromium, 18.5 percent cobalt, .07 percent carbon, 3.3 simple titanium, 4.3 percent aluminum, 5 percent molybdenum, 0.03 percent boron, balance nickel. A simply binary interlayer alloy comprising, by weight, 96 percent nickel and 4 percent boron plate was used as the interlayer alloy. This is very close to the eutectic in the nickel-boron system.

Approximately 0.3–0.5 mil (.0003 – .0005 inch of plate was deposited on each degreased mating surface and the parts were bonded by holding at 2150° F. for 2 hours under a slight compressive load of 5 p.s.i. Melting of the interlayer alloy and bonding occurred isothermally. The bonded assembly was homogenized at 2140° F. for 24 hours and aged at 1900° F. for 1 hour.

Because only the simple binary alloy was used, there remained some chemical heterogeneity at the joint interface. Such a simple interlayer might be satisfactory in some instances, e.g. where ultra-thin interlayers were possible allowing rapid homogenization or where strength requirements were such that the residual heterogeneity was acceptable. In such instances, such a coating might only be necessary on one of the surfaces.

Although as demonstrated diffusion bonds can be made utilizing the simple binary alloys or even the nickel/cobalt/boron alloys as the interlayer, high quality bonds demand more complex interlayer alloys. The presence of chromium in the interlayer alloy is advantageous for several reasons. First, chromium in the alloy itself tends to further depress the interlayer alloy melting point, allowing the bonding process to proceed at a lower temperature, up to 50° – 150° F., lower in some cases. Second, a great number of substrate alloys of interest contain chromium as an alloying addition for oxidation and corrosion resistance. By furnishing chromium to the bond region in the interlayer material, reliance on its migration thereinto by solid-state diffusion is not necessary, reducing bond cycle time and promoting homogeneity.

According to this embodiment, a lamellar, composite interlayer is utilized. This composite interlayer in a preferred embodiment comprises a chromium layer and a layer of high boron content such as nickel-boron, cobalt-boron or nickel-cobalt-boron deposited separately on one or more of the faying surfaces. In the usual case, a thin layer of chromium is first electrolytically-deposited on the degreased surface and the boron-containing layer is deposited thereover. Although the sequence has normally been performed as above, it should be noted that the particular sequence in which the deposits are laid down is immaterial in most cases to the satisfactory performance of the invention. The chromium layer, for example, could be applied over rather than under the boron-containing layer.

The thickness of the chromium layer is chosen such that the total chromium content in the interlayer region essentially corresponds to that of the substrate alloy. In other words, after the bond cycle is completed the chromium content across the interface corresponds to that across the substrate.

Bonds made utilizing the lamellar composite coating according to the present invention are indistinguishable from those made utilizing foil of the same overall composition, and the processing in the bond cycle is essentially the same. Representative overall interlayer compositions for the nickel-base superalloys have been, by weight nickel – 15 percent chromium – 2.5 percent boron, and nickel – 15 percent chromium – 15 percent cobalt – 2.5 percent boron.

Neither the chromium layer nor the nickel-boron layer, at the above compositions, will individually melt at a temperature less than 2100° F. which may be desirable in some alloy systems. However, when produced in lamellar fashion according to this invention with the individual layers in intimate atomic contact, the lamellar system will melt at the same temperature as would a homogeneous interlayer alloy of the same overall composition. It has been possible, for example, to effect high quality diffusion bonds in the nickel-base superalloys at temperatures equal to or below 2000° F.

As a result of this invention the technical advantages of having chromium in the interface region have been combined with practical advantages in the processing itself.

The exact method of interlayer deposition does not appear to be particularly important. The selection of a process for the deposition of chromium, for example, whether it be electrolytic plating, vapor deposition or pack chromizing will be dependent upon availability, convenience or economy rather than upon technical necessity.

Thickness of plates will be dependent upon the particular application in mind, fit or roughness of parts, etc., but it will generally be preferable to keep the thickness to a reasonable minimum particularly where complete homogenization across the joint interface is desired in a reasonable cycle time. The exact interlayer composition in many respects will also be a matter of choice depending upon the particular application. The overall boron content is generally selected primarily as a function of its melting-temperature depressing effect. Usually there will be no reason to have the boron content exceed 4 weight percent and, generally, it will be limited to the amount necessary to do the job.

Using the technique disclosed herein it is also possible where desired to provide an additional layer or layers of other elements, such as tungsten, molybdenum, aluminum, hafnium, etc., forming two, three or more separate layers on the faying surfaces. The principal caution here is to avoid those elements or those quantities of elements in the interlayer alloy viewed in its entirety which will interfere with either the bonding process or result in an unsatisfactory joint by, for example, the formation of deleterious brittle compounds.

Specimens formed from an alloy consisting of, by weight, 14 percent chromium, 4.5 percent molybdenum, 2 percent columbium, 1 percent titanium, 6 percent aluminum, 0.01 percent boron, 0.08 percent zirconium, balance nickel, were electrolytically plated with chromium and then coated with nickel-boron to provide a lamellar, composite plate consisting of, by weight in terms of the overall composition, 15 percent chromium, 2.7 percent boron, balance nickel. These specimens were then diffusion bonded at 2000° F. for 4 hours in vacuum. During the bonding cycle, the composite interlayer appeared to behave identically with an interlayer foil of the same overall composition. Moreover, the bonds resulting from utilization of the composite interlayer were indistinguishable from those produced using an interlayer foil, and the results have been excellent in both cases.

It has, thus, been conclusively established that the techniques described herein are extremely effective in providing high quality diffusion bonds in the superalloy systems, including some applications where alternatives do not appear to be reasonably available. The invention in its broader aspects is not limited to the specific methods, compositions and examples herein described for the purposes of illustration, but numerous modifications, alterations and additions may be made thereto without departing from the true spirit of the invention and without sacrificing its chief advantages.

What is claimed is:
1. A diffusion bonding assembly which comprises:
two superalloy substrates having matched surface portions to be joined;
a thin interlayer sandwiched between the surfaces, said interlayer comprising at least one coating bonded to at least one of the substrate surfaces to be joined;
the overall interlayer composition having as its basis metal the same base metal as the superalloys and, containing a high boron content, having a melting temperature below that of the superalloys and a melting temperature below that causing irreversible adverse metallurgical change in the substrates.

2. The assembly according to claim 1 wherein the interlayer coating comprises a first layer on at least one substrate surface and a second distinct layer thereover and in intimate atomic contact with the first layer, one layer having as its basis the basis metal of the interlayer and another layer having as its basis another element of the superalloys, at least one of the layers having a high boron content providing a substantial melting temperature depressant effect.

3. The assembly according to claim 1 wherein:
the superalloys are selected from the group consisting of the nickel-base, cobalt-base or iron-base superalloys.

4. The assembly according to claim 2 wherein:
one of the layers of the interlayer is chromium.

5. A diffusion bonding assembly which comprises:
two nickel-base superalloy substrates having matched surfaces to be joined;
a thin, lamellar interlayer sandwiched between the surfaces;
the overall interlayer composition being a nickel-base alloy having a melting point below that of the superalloy and below that causing irreversible, adverse metallurgical change in the superalloy;
the interlayer comprising at least one layer of chromium and at least one layer of a nickel boron alloy on the surface of at least one substrate.

6. The assembly according to claim 5 wherein:
the melting point of the overall interlayer is about 2000° F.

7. The assembly according to claim 5 wherein:
the interlayer thickness is about 0.0005 to 0.01 inch in thickness.

8. The assembly according to claim 7 wherein:
the overall interlayer boron content is about 1–4 weight percent.

9. The assembly according to claim 7 wherein:
the chromium content of the overall interlayer is about the same percentage as that of the superalloy.

10. A diffusion bonding assembly which comprises:
two superalloy substrates having surfaces to be joined;
a thin, lamellar interlayer sandwiched between the surfaces;
the overall interlayer composition having as its basis metal the same basis metal as the superalloy, a melting point below that of the superalloy and a melting temperature below that causing irreversible adverse metallurgical change in the superalloy;
the interlayer comprising a first layer of chromium on the surface of each substrate and a thin layer therebetween consisting of the basis metal containing a high boron content.

11. The assembly according to claim 10 wherein:
the overall interlayer boron content is about 2–3 weight percent; and
the chromium content approximates that of the substrates.

12. The assembly according to claim 11 wherein:
the interlayer contains one or more additional layers comprising at least one metal selected from the group consisting of tungsten, molybdenum, tantalum, hafnium and aluminum.

* * * * *